US012655962B1

(12) United States Patent
Doust

(10) Patent No.: US 12,655,962 B1
(45) Date of Patent: Jun. 16, 2026

(54) DOWNLIGHT

(71) Applicant: Elite Lighting, Commerce, CA (US)

(72) Inventor: Hamid Rashidi Doust, Commerce, CA (US)

(*) Notice: Subject to any disclaimer, the term of this patent is extended or adjusted under 35 U.S.C. 154(b) by 19 days.

(21) Appl. No.: 18/980,440

(22) Filed: Dec. 13, 2024

(51) Int. Cl.
*F21V 19/00* (2006.01)
*F21S 8/02* (2006.01)
*F21V 31/00* (2006.01)
*F21Y 105/18* (2016.01)
*F21Y 113/00* (2016.01)
*F21Y 115/10* (2016.01)

(52) U.S. Cl.
CPC .......... *F21V 19/0035* (2013.01); *F21S 8/026* (2013.01); *F21V 31/005* (2013.01); *F21Y 2105/18* (2016.08); *F21Y 2113/00* (2013.01); *F21Y 2115/10* (2016.08)

(58) Field of Classification Search
CPC ..... F21V 31/005; F21V 19/0035; F21S 8/026
See application file for complete search history.

(56) References Cited

U.S. PATENT DOCUMENTS

2015/0198324 A1* 7/2015 O'Brien .................. F21V 13/04 362/294
2018/0372284 A1* 12/2018 Danesh ..................... F21K 9/68
2019/0063700 A1* 2/2019 Lawrence ............... F21V 17/12
2019/0323691 A1* 10/2019 Winters ................ F21V 23/006
2020/0191344 A1* 6/2020 Van Winkle ............ F21S 8/033
2021/0071833 A1* 3/2021 Hou ......................... F21V 29/70
2021/0262650 A1* 8/2021 Danesh ................. F21V 29/773
2023/0324036 A1* 10/2023 Anuel Martinez ... F21V 29/503

* cited by examiner

*Primary Examiner* — Gerald J Sufleta, II
(74) *Attorney, Agent, or Firm* — Payan Moradian

(57) ABSTRACT

Provided is a downlight comprising: a housing, the housing having an inner and an outer portion, with a gap forming between the inner and the outer portion; a lens placed inside of the housing on top of the inner portion; an LED board placed on top of the lens, the LED board having a plurality of LEDs; a cover placed on top of the LED board inside of the housing; and a plurality of fasteners to fasten the cover to fastener receivers that are inside of the gap.

18 Claims, 7 Drawing Sheets

DOWNLIGHT

BACKGROUND OF THE INVENTION

Downlights for attachment to ceiling are known. There is a need in the art to have downlights that produce desirable light and are resistant to water damage. SUMMARY SECTION OF THE INVENTION Provided is a downlight comprising: a housing, the housing having an inner and an outer portion, with a gap forming between the inner and the outer portion; a lens placed inside of the housing on top of the inner portion; an LED board placed on top of the lens, the LED board having a plurality of LEDs; a cover placed on top of the LED board inside of the housing; and a plurality of fasteners to fasten the cover to fastener receivers that are inside of the gap. The housing can be made from a non-metal. The housing can be made from plastic and the cover is made from metal. A gasket can be placed on top of the cover, the gasket touching the housing on inside of the outer portion. The cover can be placed below the top of the outer portion, creating a space for placement of a gasket. The inner portion of the housing can have an angle to reflect light to below the lens. The inner portion of the housing can function as a reflector. The downlight can comprise a cover for a controller and the controller attached to top of the cover placed on top of the LED board. The downlight can further comprise a color change switch on top of the cover for the controller and electronics. The downlight can further comprise a mounting plate attached to the top of the cover placed on top of the LED board. The downlight can further comprise brackets on the cover. Only a single lens can be in between the LED board and outside of the housing, and the downlight further lacks a reflective paper. The lens can be placed above a bottom edge of the housing. The outer portion can be taller than the inner portion in a vertical direction, creating space for placement of the lens, the LED board, and the cover on the top of the inner portion and within the outer portion.

Provided is a downlight comprising: a housing having a height of less than one inch; a lens attached to the housing; an LED board placed on top of the lens, the LED board having a plurality of LEDs; a cover placed on top of the LED board inside of the housing, the cover placed below a top edge of the housing to create space; and a gasket placed on top of the cover in the space, the gasket touching inside of the housing. The downlight can further comprise a cover for a controller and the controller attached to top of the cover placed on top of the LED board, the cover for the controller attached to center of the cover placed on top of the LED board. The downlight can further comprise a mounting bracket attached to the cover in the top of the LED board, the mounting bracket having an opening in the center that is placed around the controller. The housing can be made from two rings of varying heights in a vertical direction. The lens can be placed above a bottom edge of the housing. The housing is made from plastic and the cover is made from metal, and the LED board has 100 to 400 LEDs placed in a concentric fashion in circular rows of from 5 to 10.

DETAILED DESCRIPTION OF THE INVENTION

Provided is a downlight that can be installed on the surface of a ceiling and is suitable for a wet environment, such as a shower or a bathroom.

Figure 1:
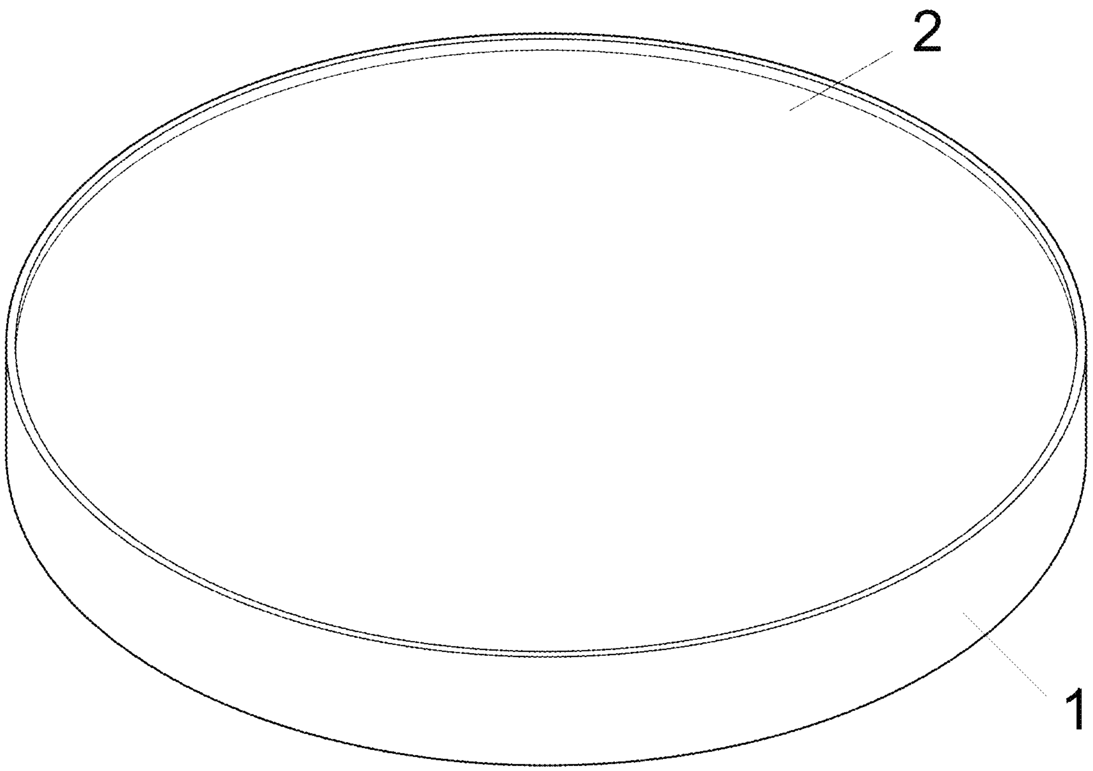
FIG. 1 illustrates a perspective view of the downlight.

FIG. 1 illustrates a perspective view of the downlight, with circular housing 1 and lens 2 on bottom of the housing. Lens 2 can be made from a transparent or translucent material Lens 2 can be offset slightly from the bottom of the housing, such as by 0.1 mm to 0.5 mm. The housing can have a height of 0.5 inches to 1 inch, such as 0.8 inch. The housing can also be square, oval, or rectangular. The housing can be made of a plastic material, or a metal such as aluminum. Plastic housing is suitable for a wet environment as it is non-conductive.

Figure 2:
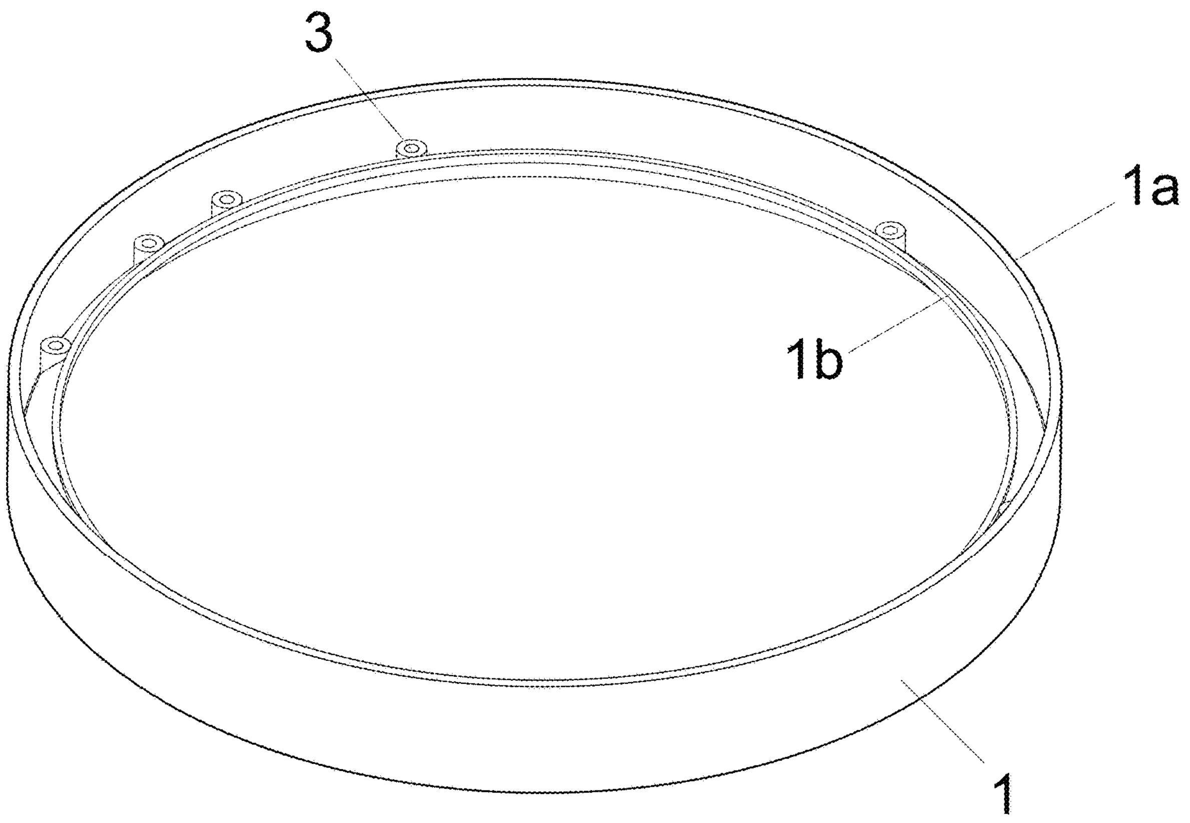
FIG. 2 illustrates a top perspective view of the housing.

FIG. 2 illustrates a top perspective view of housing 1. Ring **1*a* can form outside of the housing 1 and be visible from outside. Ring 1*a* is substantially vertical and has a height of about 0.5 inches to one inch, such as about 0.8 inch. Inner ring 1*b* has an angle and can function as a reflector. The angle of the inner ring 1*b* can be from 10 to 50 degrees in the direction illustrated in FIG. 2 in relation to the vertical in relation to outer ring 1*b*. The inner ring 1*b* can be made of a white color to act as a reflector. The inner ring 1*b* can have a lower vertical height than outer ring 1*b*, creating space for placement of the various components inside of the housing 1**.

A gap forms between inner ring **1*b* and outer ring 1*a*. A plurality of fastener receivers 3** are placed in the gap.

Figure 3:
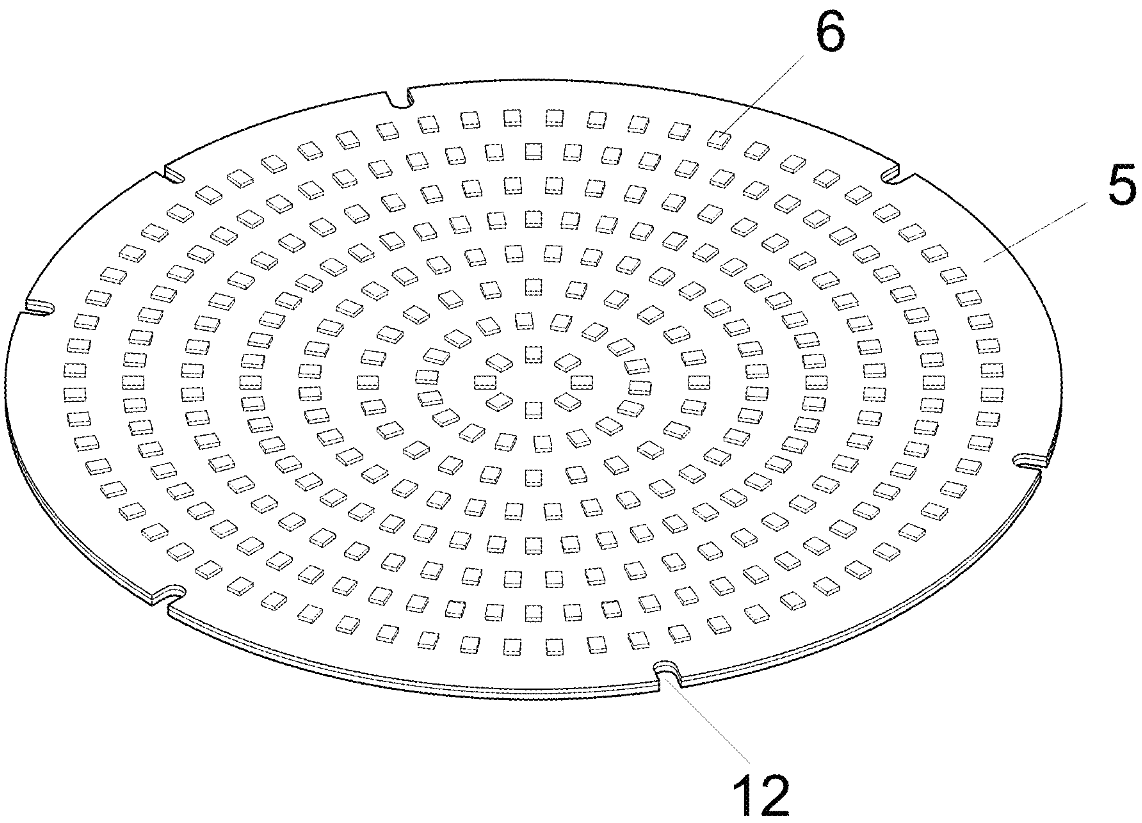
FIG. 3 illustrates an LED board with rows of LEDS.

FIG. 3 illustrates an LED board with rows of LEDS (Light emitting Diode) 6. FIG. 3 illustrates circular rows of LEDs that are uniformly spaced. Recess 12 on the sides of the LED board 5 allows for passage of fasteners. LED board 5 can have a plurality of LED rows, such as from 5 to 10 circular rows, or 7 to 9 circular rows, each placed in concentric fashion. There can be 50 to 400 LEDs 6 placed on LED board 5. The distance between each LED 6 to another LED 6 in each row is substantially the same, and the LEDs 6 are placed in a uniform manner to produce a uniform balanced light without dark spots visible to the naked eye from below the downlight.

Figure 4:
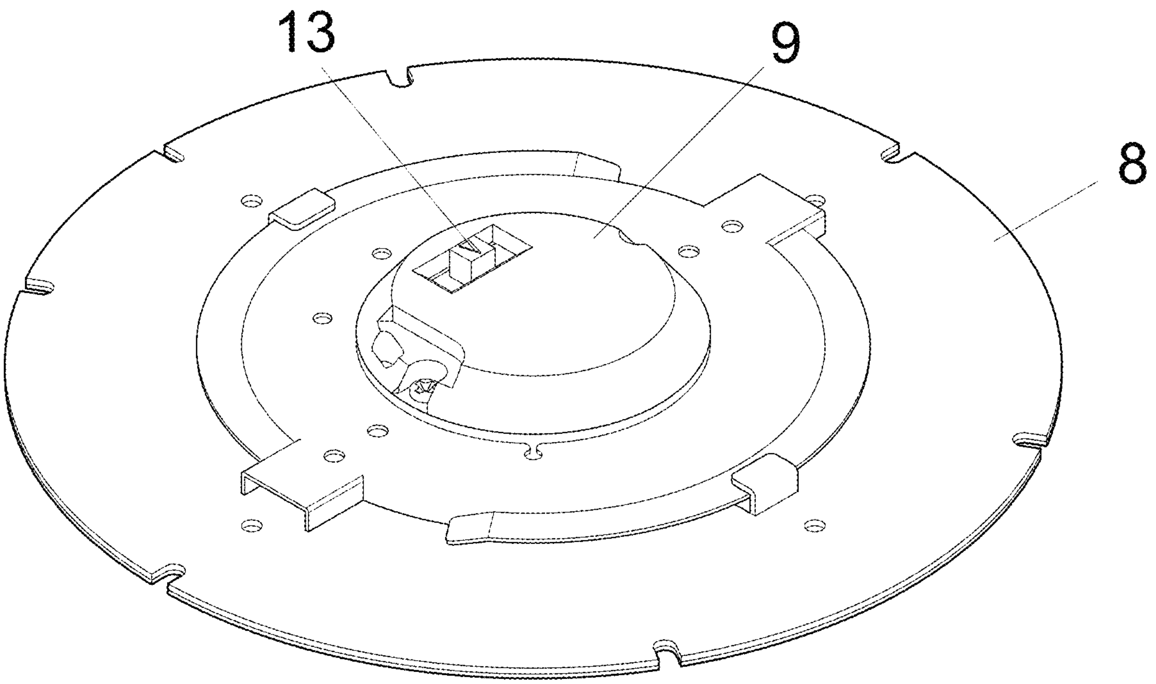
FIG. 4 illustrates the top cover 8 of the downlight.

FIG. 4 illustrates the top cover 8 of the downlight. The cover 8 also has recesses on the edge for fasteners 11. The cover 8 can be made from a metal such as aluminum or steel. A cover (for the controller/electronics) 9 with color switch 13 is placed on cover 8. The switch 13 (and **13*a***) can have positions for the following colors: 2700 k, 3000 k, 3500 k, 4000 k, and 5000 k (range of 2500 k to 5000 k, kelvins).

Figure 5:
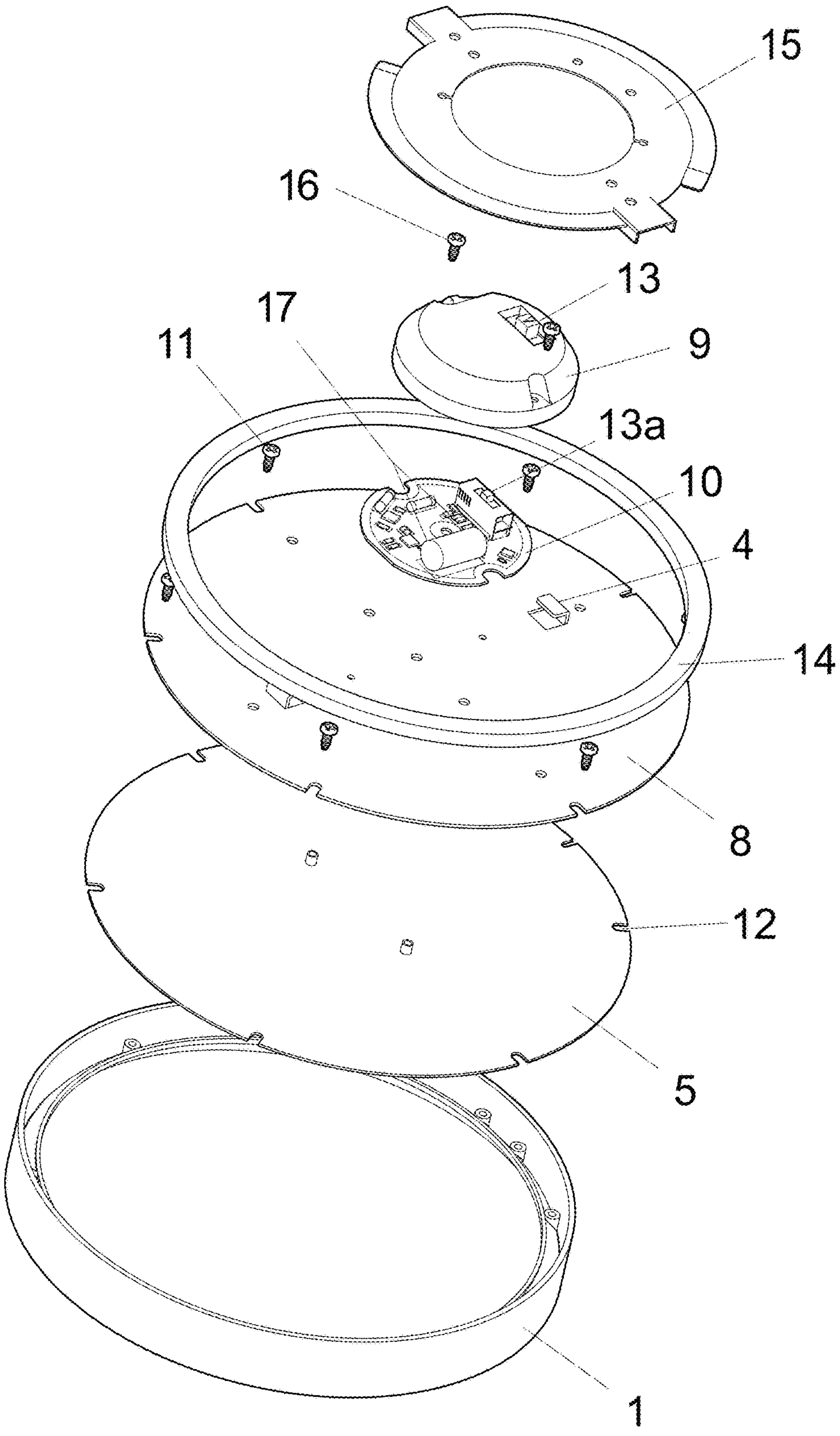
FIG. 5 illustrates exploded views of the downlight.
Figure 6:
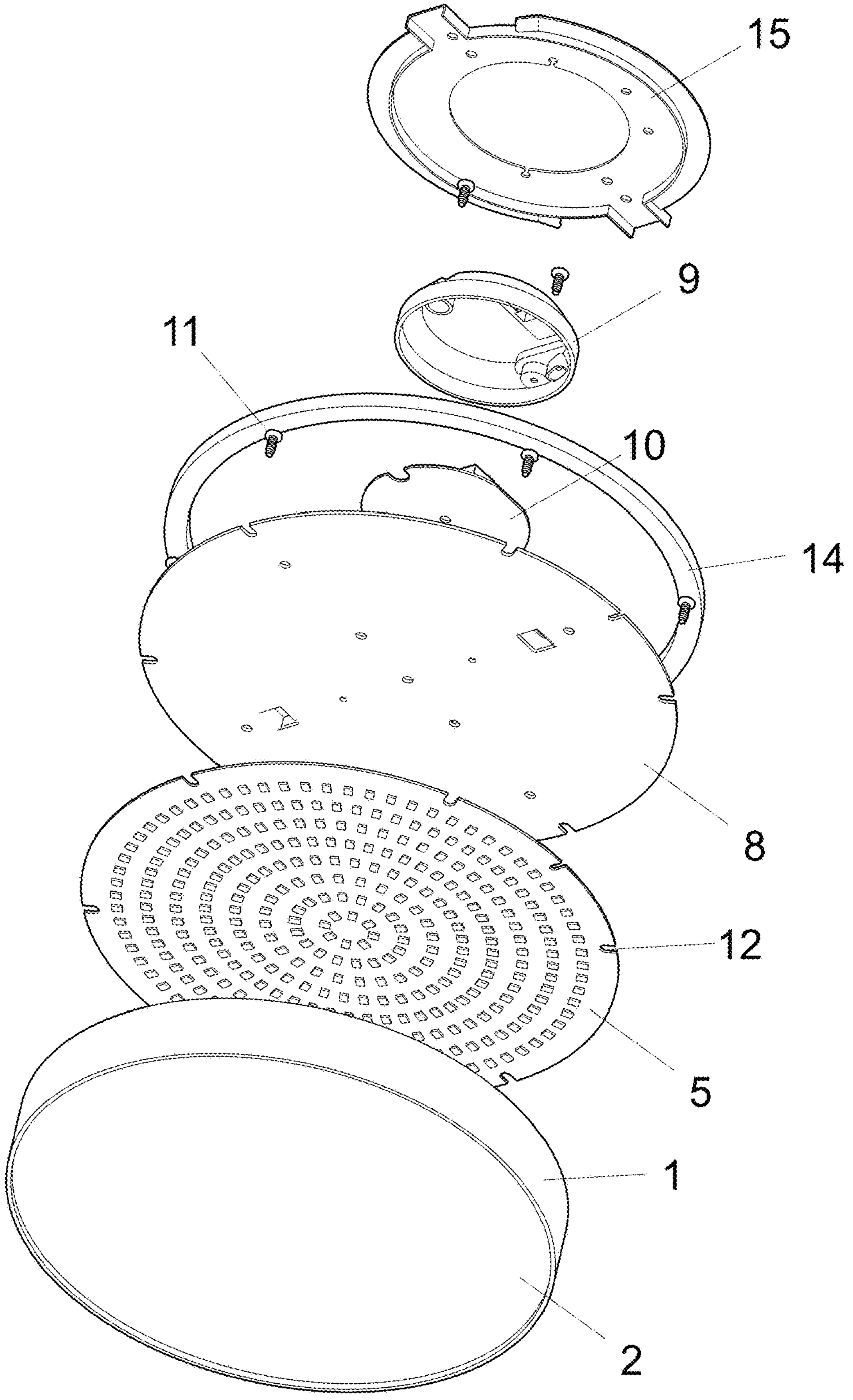
FIG. 6 illustrates exploded views of the downlight.

FIGS. 5 and 6 illustrate exploded views of the downlight. Illustrated in this view are housing 1, LED board 5, cover 8, gasket 14, electronics cover 9 and board 10, and mounting plate 15. Mounting plate 15 is secured to the top of cover 8 with bracket 4. Mounting plate 15 can have an opening in the center and is placed around the electronics cover. LED board 5 is placed on top of cover 1, being held in position by inner ring **1*b*. Cover 8 is placed immediately on top of LED board 5. Cover 8 is fastened to housing 1 with fasteners 11. Fasteners 11 goes through complementary recesses on the sides of cover 8 and LED board 5 and is secured to fastener receivers 3 in the gap of housing 1. Gasket 14 is placed on top of cover 8 and next to housing 1 to provide a seal for moisture. Gasket 8** can be made of rubber or silicone.

A cover (for the controller/electronics) 9 and base 10 are attached to the top center of the cover 8 with fasteners 16. Color changing switch 13 changes the position of color switch 13*a* on the board 10. An electronics controller 17 to regulate power (power management unit) (wattage, voltage) and carry electricity to the LEDS 6 is placed inside of electronics cover 9 on top of board 10. Board 10 can have a non-conductive layer underneath, or placed on top of a non-conductive base.

Figure 7:
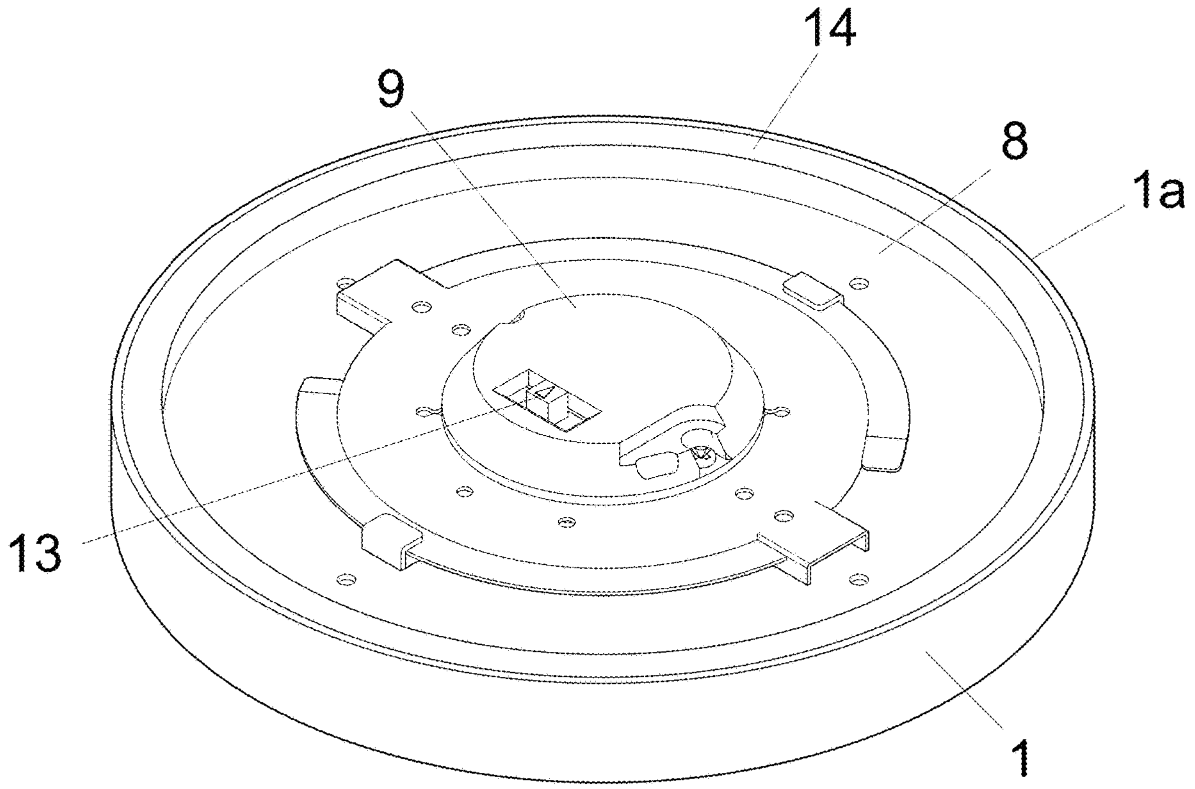
FIG. 7 illustrates a perspective view of the downlight.

FIG. 7 illustrates a perspective view of the downlight. Illustrated in this view are cover 8, gasket 14, housing 1, cover (for the controller/electronics) 9, and color switch 13. Cover 8 is placed slightly below the top of housing 1, such as about 0.1 to 0.5 mm, such as 0.3 mm to 0.5 mm. Gasket 14 goes around the inside wall of housing 1, and contacts the wall on the side to seal the housing 1 from moisture. Gasket 14 can be made from silicone or rubber.

The surface mount downlight can be attached to the surface of a ceiling with the clips on the mounting plate 15. The surface mount downlight can rely on the inside of the housing 1 as a reflector and lack a reflective paper or an additional reflector. The downlight can have only a lens 2 below the LED board 5 and outside of the housing 1.

1. Housing (1*a*-outside ring, 1*b*-inner ring, acting as a reflector)
2. Lens
3. Fastener (screw) receiver
4. Bracket
5. LED board
6. LED
7. Fastener recess
8. Cover
9. Electronics cover
10. Electronics Board/PCB
11. Fastener
12. Fastener recess
13. Color changing switch (13*a*)
14. Gasket
15. Mounting Plate
16. Fastener
17. Controller (Power Management Unit)

What is claimed is:

1. A downlight comprising:

a) a housing, the housing having an inner and an outer portion, with a gap forming between the inner and the outer portion;

b) a lens placed inside of the housing inside of the inner portion;

c) an LED board placed on top of the lens, the LED board having a plurality of LEDs;

d) a cover placed on top of the LED board inside of the housing, creating a space;

e) a plurality of fasteners to fasten the cover to fastener receivers that are inside of the gap;

f) a gasket placed on top of the cover, the gasket touching the housing on an inside of the outer portion; and g) wherein the inner portion of the housing has an angle to reflect light to below the lens.

2. The downlight of claim 1, wherein the housing is made from a non-metal.

3. The downlight of claim 1, wherein the housing is made from plastic and the cover is made from metal.

4. The downlight of claim 1, wherein the cover is placed below the top of the outer portion, creating a space for placement of the gasket.

5. The downlight of claim 1, wherein the inner portion of the housing functions as a reflector.

6. The downlight of claim 1, further comprising a cover for a controller and the controller attached to a top of the cover placed on top of the LED board.

7. The downlight of claim 6, further comprising a color change switch on top of the cover for the controller.

8. The downlight of claim 1, further comprising a mounting plate attached to the top of the cover placed on top of the LED board.

9. The downlight of claim 1, further comprising brackets on the cover.

10. The downlight of claim 1, wherein only a single lens is in between the LED board and outside of the housing, and the downlight further lacks a reflective paper.

11. The downlight of claim 1, wherein the lens is placed above a bottom edge of the housing.

12. The downlight of claim 1, wherein the outer portion is taller than the inner portion in a vertical direction, creating space for placement of the lens, the LED board, and the cover on the top of the inner portion and within the outer portion.

13. A downlight comprising:

a) a housing having a height of less than one inch, the housing having an inner and an outer portion, with a gap forming between the inner and the outer portion;

b) a lens attached to the housing;

c) an LED board placed on top of the lens, the LED board having a plurality of LEDs;

d) a cover placed on top of the LED board inside of the housing, the cover placed below a top edge of the housing to create space;

e) a gasket placed on top of the cover in the space, the gasket touching an inside of the housing;

f) wherein the inner portion of the housing has an angle to reflect light to below the lens.

14. The downlight of claim 13, further comprising a cover for a controller and the controller attached to a top of the cover placed on a top of the LED board, the cover for the controller attached to center of the cover placed on top of the LED board.

15. The downlight of claim 14, further comprising a mounting bracket attached to the cover in the top of the LED board, the mounting bracket having an opening in the center that is placed around the controller.

16. The downlight of claim 13, wherein the housing is made from two rings of varying heights in a vertical direction.

17. The downlight of claim 13, wherein the lens is placed above a bottom edge of the housing.

18. The downlight of claim 13, wherein the housing is made from plastic and the cover is made from metal, and the LED board has 100 to 400 LEDs placed in a concentric fashion in circular rows of from 5 to 10.

* * * * *